(12) United States Patent
Gallant et al.

(10) Patent No.: US 7,949,802 B2
(45) Date of Patent: May 24, 2011

(54) ENHANCED COMMUNICATION VIA A SERIAL INTERFACE

(75) Inventors: Stephen Gallant, San Diego, CA (US); Kening Ren, San Diego, CA (US); Marko Bartscherer, Chula Vista, CA (US); Kai Inha, Jarvenpaa (FI)

(73) Assignee: Nokia Corporation, Espoo (FI)

( * ) Notice: Subject to any disclaimer, the term of this patent is extended or adjusted under 35 U.S.C. 154(b) by 532 days.

(21) Appl. No.: 11/636,371

(22) Filed: Dec. 8, 2006

(65) Prior Publication Data

US 2008/0140887 A1 Jun. 12, 2008

(51) Int. Cl.
*G06F 3/00* (2006.01)
*G06F 13/00* (2006.01)

(52) U.S. Cl. ............... 710/36; 710/8; 710/300; 710/305
(58) Field of Classification Search .................. None
See application file for complete search history.

(56) References Cited

U.S. PATENT DOCUMENTS

| | | | |
|---|---|---|---|
| 6,253,329 B1 | 6/2001 | Kang | |
| 2003/0043771 A1* | 3/2003 | Mizutani et al. | 370/338 |
| 2003/0151593 A1* | 8/2003 | Hong | 345/163 |
| 2004/0153856 A1* | 8/2004 | Saotome et al. | 714/43 |
| 2005/0268000 A1 | 12/2005 | Carlson | |
| 2006/0223486 A1 | 10/2006 | Ruff et al. | |

FOREIGN PATENT DOCUMENTS

| | | |
|---|---|---|
| EP | 1487081 | 12/2004 |
| WO | WO 03/077504 | 9/2003 |
| WO | WO 2006/045617 | 5/2006 |

OTHER PUBLICATIONS

USB Overview, Jul. 19, 2007, Access Communications Pty Ltd, ABN 62 002 111 659, http://www.accesscomms.com.au/reference/usb.htm [online, accessed on Jan. 13, 2011].*
David Luke; "Linking Mobiles with USB: A Look at the OTG Supplement;" Internet Citation, Jan. 9, 2003; retrieved from the Internet: http://www.commsdesign.com/printableArticle?articleID=16500233 on Jan. 21, 2008; whole document.
Tony Smith; "Motorola moot USB rechargeable phone recharger;" Internet Citation, Jun. 20, 2006; retrieved from the Internet: http//www.reghardware.co.uk/2006/06/2/0/moto_usb_power_pack/print.html on Mar. 5, 2008; whole document.
"On-The-Go Supplement to the USB 2.0 Specification;" Revision 1.2; Apr. 4, 2006.

* cited by examiner

*Primary Examiner* — Tariq Hafiz
*Assistant Examiner* — Scott Sun
(74) *Attorney, Agent, or Firm* — Alfred A. Fressola; Ware, Fressola, Van Der Sluys & Adolphson LLP

(57) ABSTRACT

This invention relates to a method, a computer program product, an apparatus and a system enabling a communication between a first electronic device and a compatible second electronic device via the identification (ID) pin of a serial interface of the first electronic device.

36 Claims, 7 Drawing Sheets

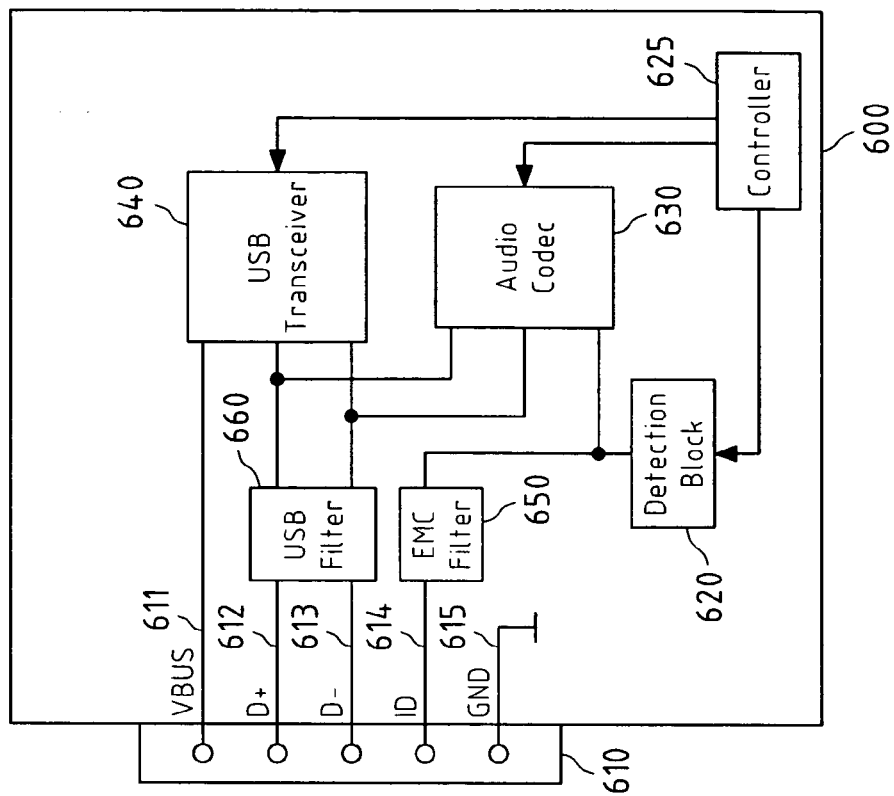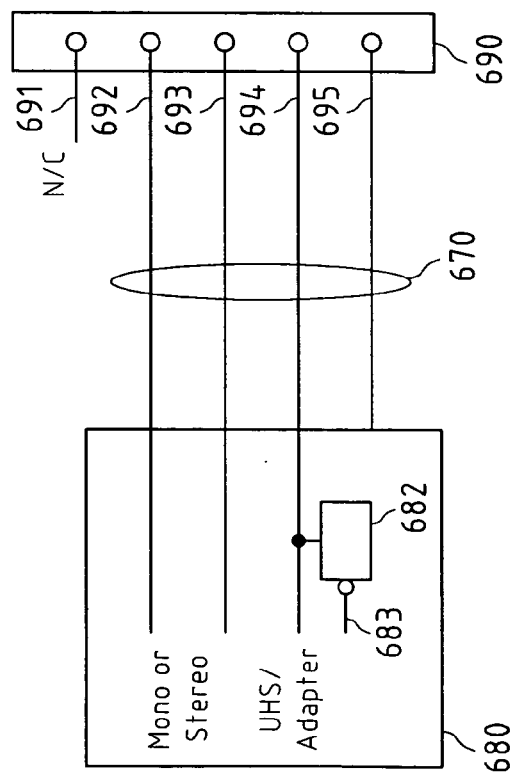
Fig.6b
Fig.6a

ENHANCED COMMUNICATION VIA A SERIAL INTERFACE

FIELD OF THE INVENTION

This invention relates to a method, an apparatus, a computer program product and a system for an electronic device comprising a serial interface.

BACKGROUND OF THE INVENTION

A serial interface such as the Universal Serial Bus (USB) is a technology which provides a fast, cabled data connection between a complex device (e.g. a PC) which is called the Host and a connected peripheral (e.g. a mouse, keyboard etc.) which is called the Device.

A serial interface according to the USB standard comprises two data lines (D+ and D−) a ground line (GND) and a voltage supply line ($V_{Bus}$).

According to the USB standard, the D+ and D− lines are configured to be used for data transfer.

The VBus line enables a connected device, which might not have an own power supply or where the device internal power supply is limited (e.g. a battery pack) to receive electrical power from the other connected device.

In accordance with the USB standard the devices roles (host role and device role) are fixed, i.e. by the type of connector of each device (A-plug and B-plugs) the role of the devices is defined and e.g. connection of one host to another host device is not possible.

The USB On-The-Go standard (USB OTG) extends the basic USB standard in such a way that the interface contains an additional identification (ID) line which enables the devices to switch and/or negotiate the host/device role of the connected devices.

According to the USB OTG standard the A-plug (connected to USB OTG host) the ID pin is connected to ground and the B-plug (connected to USB OTG device) the ID pin is left floating.

For a more detailed description of the USB OTG standard it is hereby referred to the USB OTG standard "On-The-Go Supplement to the USB 2.0 Specification; Apr. 4, 2006".

Small devices like mobile phones, audio players, personal digital assistants and so on can only provide limited space for connectors and interfaces for connection to other devices and accessories.

For instance, traditionally audio devices that used 2.5 mm or 3.5 mm universal headsets (UHS) required a bulky and expensive 2.5 mm or 3.5 mm universal headset jack (UHJ). Devices that also provided USB functionality required two connectors.

SUMMARY OF THE INVENTION

According to the invention a method, a computer program, a computer program product, an apparatus and a system for enabling enhanced communication from a first electronic device to another electronic device via a serial interface is presented.

A method is proposed, comprising enabling a communication between a first electronic device and a compatible second electronic device via the identification pin of a serial interface of said first electronic device.

The serial interface might be an interface as known as an USB interface or any other interface comprising at least one data line for data communication and at least one ID line for device role (host/device) identification purposes, e.g. as provided by the USB OTG standard.

The first electronic device comprises a serial interface, wherein said serial interface may represent a Micro USB interface or a Mini USB interface or any other USB interface comprising at least five pins or any other serial interface, wherein the ID pin of said serial interface is used to allow a communication with a compatible second electronic device in case this second electronic device is connected to the first electronic device via said serial interface. Compatible according to the invention means, that the second device is configured to communicate via the ID pin of the serial interface of said first electronic device.

Said communication may comprise a transmission from said second electronic device to said first electronic device via said ID pin and/or it may comprise a transmission from said first electronic device to said second electronic device via said ID pin. Said transmission may be any kind of transmission, e.g. like digital data transmission, or transmission of an analog signal, or a combination of both. For instance, said transmission may be used for signaling, or for transmitting an analog signal, e.g. an audio signal, or for transmitting digital data.

For instance, the first electronic device may contain a signal unit connected to the ID pin of the serial interface connector and configured to perform the communication via the ID pin.

E.g., according to the USB OTG standard, the ID pin of a USB Micro B-plug is floating and the ID pin of a Micro A-plug is connected to ground. Thus, if said first USB interface represents a USB Micro interface, then it may be a Micro Type B-plug or a USB Micro receptacle suited to be configured to a Micro Type B-plug. For instance, the first device may comprise a first Micro Type B USB receptacle connected to the first USB interface, or said first USB interface may represent a first Micro Type B USB receptacle, or, the USB interface may be connected to cable terminated with a Micro Type B-plug. Furthermore, said USB interface may be a Mini USB interface.

Thus, the present invention allows to use the ID-pin of the first serial interface for data communication to a compatible second electronic device, which enables enhanced data communication between both devices, because besides the at least one data line of the serial interface connection a third line via the ID pin may be used for communication. For instance, any suited link system may be used for this communication, wherein the first electronic device may comprise a signal unit which is adapted to perform signaling according to the link system. For instance, said communication via the ID pin may be performed by a dual impedance Enhancement Control Interface (ECI), or by an accessory control interface (ACI).

For instance, the at least one data line of the serial interface may be used according to the respective serial interface standard, and without interfering this serial interface standard, a further communication may be performed via the ID pin of said first interface.

Thus, the present invention may allow to use the full serial interface functionality via said at least one data line and may allow simultaneously a further communication via the ID pin without interfering the serial interface standard.

For instance, said first electronic device may represent an accessory device which is configured to be connected to a terminal like mobile phone, PC or a handheld, wherein this accessory may be a headset, or any other kind of accessory.

According to an embodiment of the present invention, said serial interface may represent a USB interface.

Thus, both the first device and the second device may represent devices having USB standard/protocol compatibility, i.e. USB compliance. A compatible USB device according to the invention represents a USB device which is configured to communicate via the ID pin of an USB interface, and a non-compatible USB device according to the invention represents a USB device which is not configured to communicate via the ID pin of an USB interface. Furthermore, the first device and/or the second device may comprise an USB interface without providing USB compliance.

For instance, the at least one data line may present the D+ and D− lines of the USB interface, and these D+ and D− lines may be used according to the USB standard, and without interfering this USB standard, a further communication may be performed via the ID pin of said first interface.

According to an embodiment of the present invention, said method further comprises at least one out of transmitting at least one information parameter for identifying the first electronic device via said communication; and receiving at least one information parameter for identifying the second electronic device via said communication.

Thus, based on said at least one information parameter the first electronic device may identify a connected second electronic device and/or the connected second electronic device may identify the first electronic device without interfering the USB standard.

According to an embodiment of the present invention, said communication via the ID pin of said serial interface is based on an Enhancement Control Interface (ECI) link.

Said ECI link may be performed by a signal unit connected to the ID pin of the USB interface.

According to an embodiment of the present invention, said method further comprises negotiating, based on said at least one information parameter, a configuration for a wireless interface of said first electronic device, said configuration enabling a wireless connection between said first and said second electronic device.

For instance, said first electronic device may represent an accessory which comprises a wireless interface, which may be connected via a RF unit to an antenna. For instance, said wireless interface may be a Bluetooth interface, or a WLAN interface or any other wireless interface suited to establish a wireless connection to said second electronic device. Said second electronic device may represent a terminal.

Said first electronic device may be connected to a terminal by means of said serial interface, thereby establishing a serial interface connection between the first electronic device and the terminal. The first electronic device may enable a communication via the ID pin with the connected terminal, and e.g. at least one information parameter may be transmitted from the first electronic device to the connected terminal via the ID pin in order to identify the connected first electronic device. Based on this identification, the terminal may determine a configuration for the wireless communication between the first electronic device and the terminal, and/or the terminal may transmit a wireless configuration via the ID pin communication to the first electronic device for negotiating a configuration for the wireless interface, and the wireless connection between the first electronic device and the terminal may be established. The wireless connection may be started by the first electronic device, or by the connected terminal.

Summarized, the communication via the ID pin may be used to negotiate a wireless configuration between the first electronic device and a connected terminal in order to establish a short-range radio connection. This way, the present invention allows any easy and simple configuration of wireless interfaces of a first electronic device to a terminal via the serial interface, wherein this configuration does not effect the serial interface standard since the data pins of the serial interface may not be used for negotiating the wireless configuration. After establishing the wireless communication, everything else like audio, or control operations may be performed via the wireless communication link. For instance, said first electronic device may be any kind of a wired Bluetooth accessory or headset, wherein the wireless connection is established automatically when connected to the terminal.

According to an embodiment of the present invention, the method further comprises receiving power from said second electronic device via said serial interface.

According to an embodiment of the present invention, said first electronic device comprises a rechargeable power supply, the method further comprises charging said rechargeable power supply with said received power.

According to an embodiment of the present invention, said communication via the ID pin of the serial interface comprises at least one out of: transmitting an analog signal via the ID pin, and receiving an analog signal via the ID pin.

For instance, said analog signal may represent an audio signal, or a video signal, or any other analog signal.

For instance, said first electronic device may represent a terminal, wherein said terminal is configured to be connected to an USB audio device, e.g. a headset or anything else.

According to an embodiment of the present invention, said method further comprises detecting whether a device connected to the serial interface of said first electronic device represents a compatible device, wherein a compatible device under the invention represents a device being configured to communicate via the ID pin of a serial interface.

For instance, said first electronic device may comprise a detection unit for performing said detecting. Said detection may be performed by means of the ID pin of said serial interface, e.g. by detecting a voltage level at the ID pin, wherein a detected voltage within a predetermined range may indicate a compatible device.

According to an embodiment of the present invention, said serial interface comprises at least one data line, and in a first state said first electronic device is configured to enable serial interface functionality via at least one out of the at least one data line of said serial interface, and wherein in a second state said first electronic device is configured to enable communication via the ID pin of the serial interface; and wherein the method comprises: switching said first electronic device into the first state in case the connected device is identified as a non-compatible device; and switching said first electronic device into the second state in case the connected electronic device is identified as a compatible device.

Thus, if a common serial interface device which is not suited to communicate with the first electronic device via the ID pin is detected, then the first electronic device switches into the first state and is configured to provide the full serial interface functionality via the at least one data line, and wherein in said second state the communication via the ID pin is enabled.

According to an embodiment of the present invention, said serial interface is a USB interface, and in said first state said first device is configured to enable USB functionality via at least one out of the D+ pin and D−pin.

Thus, according to the first state said device may provide full USB compliance, i.e. USB standard/protocol compatibility.

According to an embodiment of the present invention, said first electronic device comprises an audio unit, said audio unit being configured to communicate to a compatible USB audio device, and wherein in said second state said first electronic device enables said audio unit to communicate at least one audio signal between the first electronic device and the compatible USB audio device via at least the ID pin of said USB interface.

According to an embodiment of the present invention, said compatible USB device is configured to be switched into one out of at least two states, and wherein said method further comprises: detecting a state out of said at least two states of said second electronic device, and switching the first electronic device into a state corresponding to the detected state of the compatible USB device.

According to an embodiment of the present invention, said detecting is based on detecting a voltage level at the ID pin of the serial interface.

E.g., this serial interface may be a USB interface.

For instance, each state of said at least two states may correspond to a voltage range, and based on the detected voltage level at the ID pin the corresponding state can be determined.

According to an embodiment of the present invention, said compatible USB audio device is configured to be switched into one out of at least two states, wherein a first state of said at least two states represents a normal audio mode, and wherein a second state of said at least two states represents a hook mode suited for performing control operations; and wherein said method further comprises: detecting a state out of said at least two states of said second electronic device; switching the first electronic device into the second state in case the first state is detected; and switching the first electronic device into a third state in case the second state is detected, wherein in said third state said first electronic device is configured to receive control signals from the audio device.

According to an embodiment of the present invention, said compatible USB audio device represents one out of a headset and a headset-USB adapter, wherein in said second state of the first electronic device the audio unit connects a microphone input line of said audio unit to the ID pin of said USB interface and connects at least one speaker line of said audio unit to at least one of the D+ and D− pin of said USB interface. For instance, two speakers may be connected to both the D+ and D− pins of said USB interface.

According to an embodiment of the present invention, said first electronic device comprises a USB transceiver which is configured to enable said USB functionality according to the first state, said method further comprising one out of: turning off said USB transceiver in case that the first electronic device is not in the first state; and switching said USB transceiver into three-state logic state in case that the first electronic device is not in the first state.

Thus, any loading interference between the D+/D− lines and the audio lines may be eliminated.

Furthermore, an electronic device is proposed, comprising: a serial interface; and a signal unit configured to enable a communication between said first electronic device and a compatible second electronic device via the ID pin of said serial interface.

The explanations concerning the method mentioned above and the embodiments thereof also holds for this electronic device and its embodiments. E.g., said serial interface may represent a USB interface.

Furthermore, a further electronic device is proposed, comprising: a serial interface comprising at least one data line and an identification pin (ID pin); and a wire configured to be connected to one out of a speaker and a microphone, wherein said wire is configured to be connected to the ID pin of said serial interface.

According to an embodiment of the present invention, said further device is one out of a headset and a headset serial interface-adapter, wherein said headset serial interface-adapter is configured to connect a headset with a serial interface of an electronic device.

According to an embodiment of the present invention, said further device is configured to be switched into one out of at least two states, wherein a first state of said at least two states represents a normal audio mode wherein said wire is connected to the ID pin of said serial interface, and wherein a second state of said at least two states represents a hook mode suited for performing control operation, wherein in said second state said device is configured to switch a predetermined voltage level to the ID pin of said serial interface.

According to an embodiment of the present invention, said serial interface is a USB interface.

Furthermore, a system is proposed, comprising a first electronic device as mentioned above, and comprising a further electronic device as mentioned above, wherein said first electronic device and said further electronic device are connected via their serial interfaces, and wherein both the first and the further electronic devices are configured to communicate via the ID-pin of their serial interfaces to each other.

Further, an electronic device is proposed, comprising: serial interface means; and signal means for enabling communication between said first electronic device and a compatible second electronic device via the ID pin of said serial interface means.

Finally, a computer program product in which a program code is stored in a computer readable medium is proposed, said program code realizing the method mentioned above. Said program code may further realize the embodiments of the method mentioned above.

These and other aspects of the invention will be apparent from and elucidated with reference to the embodiments described hereinafter.

BRIEF DESCRIPTION OF THE FIGURES

In the figures show:

FIG. 6a: a block diagram of a fifth exemplary embodiment of an electronic device according to the present invention;

FIG. 6b: a block diagram of a sixth exemplary embodiment of an electronic device according to the present invention;

DETAILED DESCRIPTION OF THE INVENTION

Figure 1:
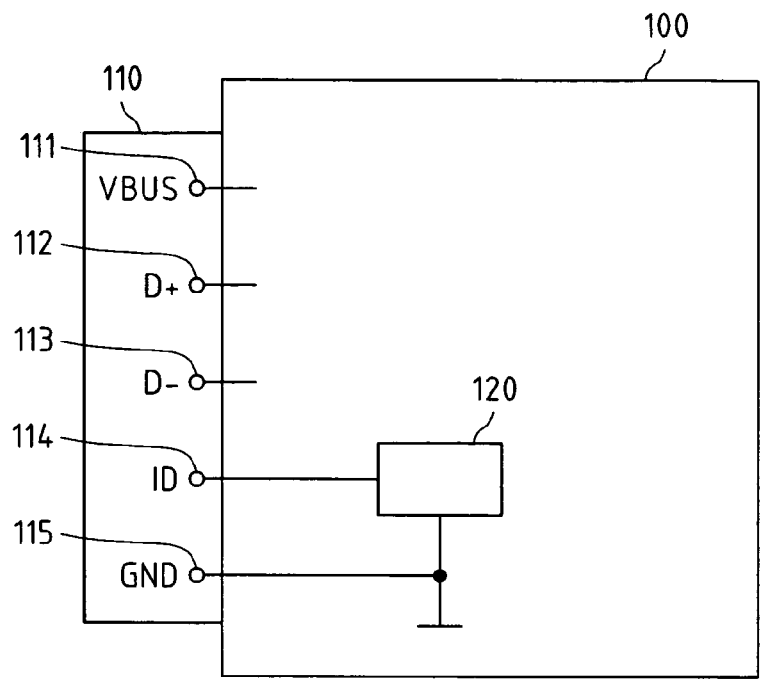
FIG. 1: a block diagram of a first exemplary embodiment of an electronic device according to the present invention.

FIG. 1 depicts a block diagram of a first exemplary embodiment of a first electronic device 100 according to the present invention. The first device 100 comprises a serial interface 110, wherein said serial interface 110 comprises at least one data line 112, 113 and one identification pin 114. Furthermore, said serial interface may comprise a power supply line 111, and a ground line 115. The serial interface 110 of the first electronic 100 depicted in FIG. 1 is only an exemplary serial interface 100, e.g. said serial interface 100 may only comprise one data line or more than two data lines, and it is not restricted to an USB interface.

Thus, any kind of serial interfaces 110 comprising at least one data line and at least one ID line may be used for the serial interface 110 depicted FIG. 1. The same holds for the following exemplary embodiments.

The ID pin 114 of said serial interface is used to allow a communication with a compatible second electronic device (not shown in FIG. 1) in case this second electronic device is connected to the first electronic device 100 via said serial interface 110. Compatible according to the invention means, that the second device is configured to communicate via the ID pin 114 of the serial interface 110 of said first electronic device 100.

Said communication may comprise a transmission from said second electronic device to said first electronic device 100 via said ID pin 114 and/or it may comprise a transmission from said first electronic device 100 to said second electronic device via said ID pin 114. Said transmission may be any kind of transmission, e.g. like digital data transmission, or transmission of an analog signal, or a combination of both. For instance, said transmission may be used for signaling, or for transmitting an analog signal, e.g. an audio signal, or for transmitting digital data.

For instance, the first electronic device 100 may contain a signal unit 120 connected to the ID pin of the serial interface 110 and configured to perform the communication via the ID pin 114.

Thus, the present invention allows to use the ID-pin of the first serial interface 110 for data communication to a compatible second electronic device, which enables enhanced data communication between both devices, because besides the at least one data line 112, 113 of the serial interface connection a third line via the ID pin 114 may be used for communication. For instance, any suited link system may be used for this communication, wherein the signal unit 120 is adapted to perform signaling according to the link system.

Furthermore, the present invention might allow signaling via the ID pin without interfering the serial interface standard, since according to a data transfer according to a serial interface standard may be performed via the at least one data line 112, 113. Thus, an additional signaling can be implemented easily.

For instance, said serial interface 110 may represent a first USB interface 110, wherein said USB interface 110 may represent a Micro USB interface or a Mini USB interface or any other USB interface comprising at least five pins. Said first USB interface 110 comprises a VBus pin 111, a D+ pin 112, a D− pin 113, an ID pin 114 and a GND pin 115. Said electronic device 100 further comprises a signal unit 120 which is connected to the ID pin 114 in order to enable a communication between said electronic device and a second electronic device being connected to said first USB interface 110. Said second electronic device may represent an electronic device being similar to that depicted in FIG. 1, i.e. the second electronic device may comprise a signal unit connected to the ID pin of an USB interface of said second electronic device, wherein said signal unit is configured to communicate via the ID pin to the signal unit 120 of said first electronic device.

Thus, both the first electronic device 100 and the second electronic device may represent devices having USB standard/protocol compatibility, i.e. USB compliance. A compatible USB device according to the invention represents a USB device which is configured to communicate via the ID pin of an USB interface, and a non-compatible USB device according to the invention represents a USB device which is not configured to communicate via the ID pin of an USB interface. Furthermore, the first device and/or the second device may comprise an USB interface without providing USB compliance.

According to the USB standard, the ID pin of a USB Micro B-plug is floating and the ID pin of a Micro A-plug is connected to ground. Thus, if said first USB interface 110 represents a USB Micro interface, then it may be a Micro Type B-plug or a USB Micro receptacle suited to be configured to a Micro Type B-plug. For instance, the first device 100 may comprise a first Micro Type B USB receptacle connected to the first USB interface 110, or said first USB interface 100 may represent a first Micro Type B USB receptacle, or, the first USB interface 110 may be connected to cable terminated with a Micro Type B-plug. Furthermore, said first USB interface 110 may be a Mini USB interface.

Thus, the present invention allows to use the ID-pin of the first USB interface for data communication to a compatible second electronic device, which enables enhanced data communication between both devices, because besides the D+ and D− lines of the USB connection a third line via the ID pin may be used for communication. For instance, any suited link system may be used for this communication, wherein the signal unit 120 is adapted to perform signaling according to the link system. For instance, said communication via the ID pin may be performed by a dual impedance Enhancement Control Interface (ECI), or by an accessory control interface.

The purpose of the so called ACI is to enable identification of different accessory (types) by parameters stored as digital data within a memory of an ACI ASIC, which can be placed within the accessory or preferably the accessory connector. The ACI functionality is e.g. described in the published patent application WO03/077504.

In contrast to this the ECI is rather about determining features and functionalities of a connected accessory rather then detecting the accessory itself. ECI functionality is described for example in the published patent application WO06/045617.

Furthermore, the present invention may allow signaling via the ID pin without interfering the USB OTG standard, since according to the USB OTG standard data transfer is performed via the D+ and D− lines. Thus, an additional signaling can be implemented easily.

For instance, the D+ and D− pins 112, 113 may be used according to the USB OTG standard, and without interfering the USB OTG standard, a further communication may be performed via the ID pin 114 of said first interface 114.

Figure 3:
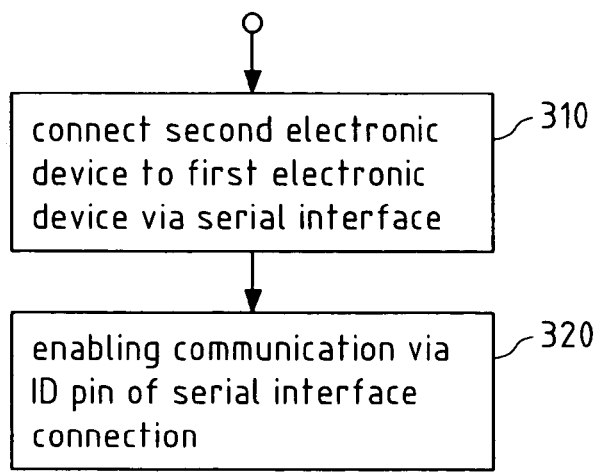
FIG. 3: a flowchart of a first exemplary embodiment of a method according to the present invention.

FIG. 3 shows a first exemplary embodiment of a method according to the present invention, wherein after serial interface a second electronic device is connected to the first electronic device 100 via the serial interface 110 (step 310), i.e. by connecting said second electronic device to said serial interface 110, a communication via the ID pin 114 between the first electronic device 100 and the second electronic device is established (step 320). For instance, said serial interface 110 may represent a USB interface 110, and said serial interface connection may represent a USB connection, e.g. a USB OTG connection.

The explanations and advantages concerning this first exemplary embodiment of a first electronic device 100 according to the present invention also hold for the succeeding exemplary embodiments.

Figure 2:
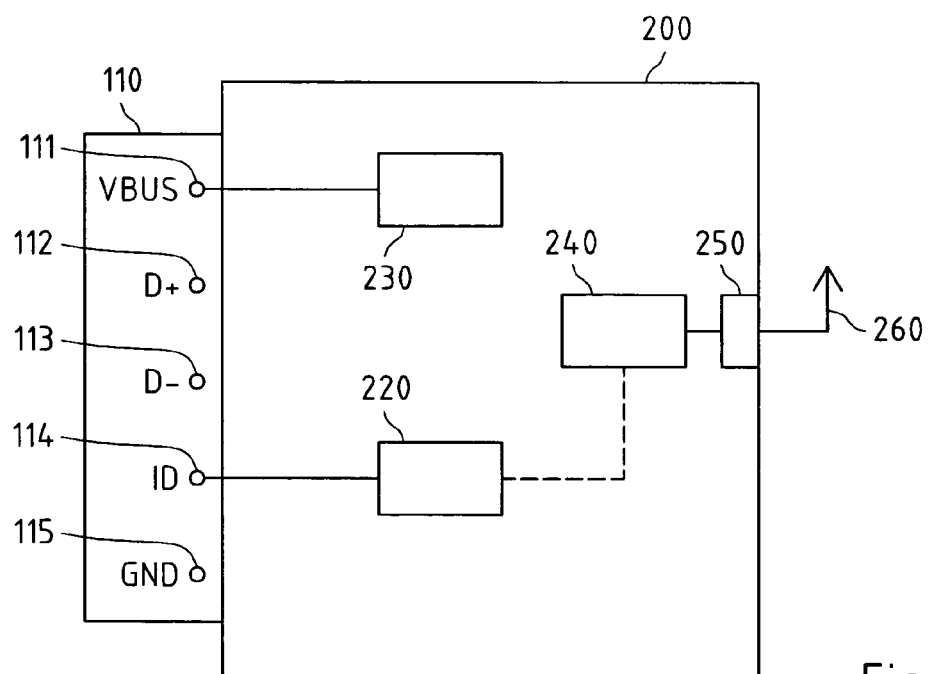
FIG. 2: a block diagram of a second exemplary embodiment of an electronic device according to the present invention.

FIG. 2 depicts a block diagram of a second exemplary embodiment of a first electronic device 200 according to the present invention. The first device 200 comprises a first serial interface 110 according to the first exemplary embodiment depicted in FIG. 1.

For instance, in case the first serial interface 110 represents a USB interface, this first electronic device 200 may represent an USB accessory 200 that can be connected to an Mini or USB connector of a terminal, e.g. by means of a Mini or Micro USB connector, wherein said accessory 200 may receive power from a connected terminal via the power supply line VBus 111 of the USB interface 110. For instance, said accessory may comprise a rechargeable power supply 230, wherein said rechargeable power supply 230 is charged with said received power.

Furthermore, said accessory 200 comprises a signal unit 220, wherein this signal unit 200 enables communication via the ID pin 114 to a connected terminal, e.g. for identification of said accessory 200. For instance, said signal unit 220 may be an ECI or an ACI unit.

Further, said accessory 200 may comprise a wireless interface 240, which may be connected via a RF unit 250 to an antenna 260. For instance, said wireless interface may be a Bluetooth interface, or a WLAN interface or any other wireless interface suited to establish a wireless connection to said terminal.

Figure 4:
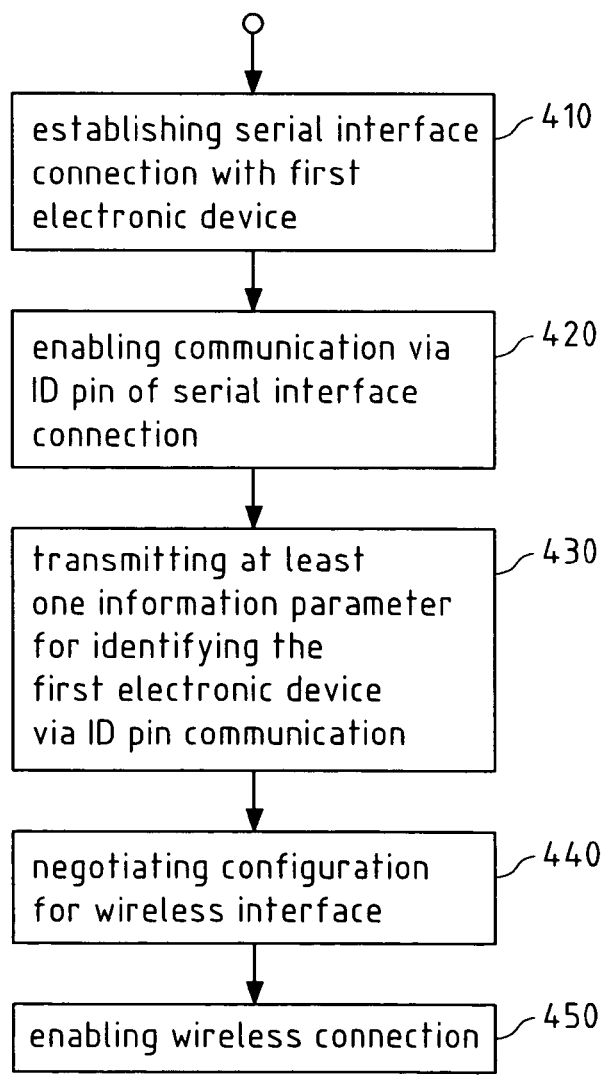
FIG. 4: a flowchart of a second exemplary embodiment of a method according to the present invention.

The configuration of said wireless interface 240 in order to communicate with said terminal will be explained by means of the second exemplary embodiment of a method according to the present invention depicted in FIG. 4: Said first electronic device 200 may be connected to a terminal by means of said serial interface 110, thereby establishing a serial interface connection with the first electronic device (step 410),e.g. USB interface connection in case the serial interface 110 represents a USB interface. The first electronic device 200 enables a communication via the ID pin 114 with the connected terminal (step 420), and at least one information parameter is transmitted from the first electronic device 200 to the connected terminal via the ID pin in order to identify the connected first electronic device 200 (step 430). Based on this identification, the terminal may determine a configuration for the wireless communication between the first electronic device 200 and the terminal, and/or, the terminal may transmit a wireless configuration via the ID pin communication to the first electronic device for negotiating the configuration for the wireless interface 240 (step 440), and the wireless connection between the first electronic device 200 and the terminal can be established (step 450). The wireless connection may be started by the electronic device 200, or by the connected terminal.

Summarized, the communication via the ID pin may be used to negotiate a wireless configuration between the first electronic device 200 and a connected terminal in order to establish a short-range radio connection. This, the present invention allows any easy and simple configuration of wireless interfaces of an electronic device 200 to a terminal via the serial interface 110, which may represent a USB interface, wherein this configuration may not affect the serial interface standard since the at least one data pin 112, 113, e.g. the D+ and D− lines of an USB interface, are not used for negotiating the wireless configuration. After establishing the wireless communication, everything else like audio, or control operations may be performed via the wireless communication link.

For instance, said first electronic device may be any kind of a wired Bluetooth accessory or headset, wherein the wireless connection is established automatically when connected to the terminal.

Figure 5B:
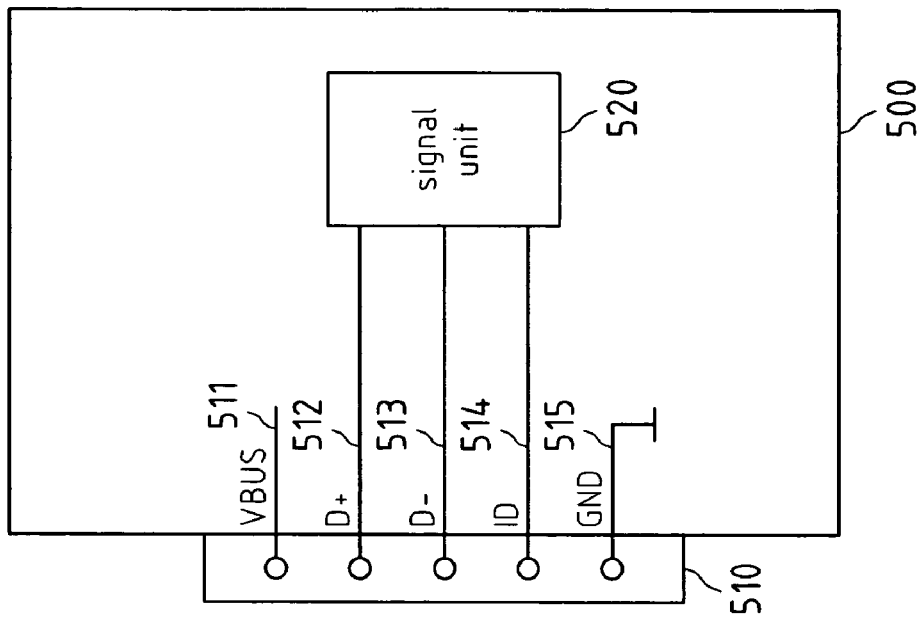
FIG. 5b: a block diagram of a fourth exemplary embodiment of an electronic device according to the present invention.
Figure 5A:
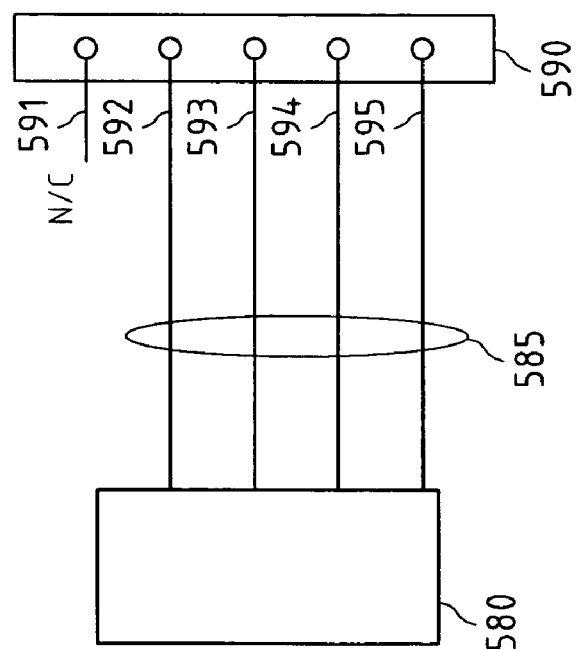
FIG. 5a: a block diagram of a third exemplary embodiment of an electronic device according to the present invention.

FIG. 5a depicts a block diagram of a third exemplary embodiment of an electronic device 580, in the sequel denoted as second electronic device 580, according to the present invention, and FIG. 5b depicts a block diagram of fourth exemplary embodiment of an electronic device 500, in the sequel denoted as first electronic device 500, according to the present invention.

For instance, the first electronic device 500 may represent a terminal, e.g. a PC or a mobile phone or a handheld or anything else, wherein said terminal 500 comprises a serial interface 510, e.g. a Micro or Mini USB interface 510, and wherein said USB interface 510 may represent a Mini or Micro Type B USB receptacle/plug. In the sequel, this serial interface 510 will be exemplarily assumed to represent a USB interface, but the following embodiments are not restricted to USB interfaces exclusively.

Furthermore, said terminal 500 comprises an signal unit 520, wherein said signal unit 520 may be configured to connect the terminal to a headset. For instance, said signal unit may represent an audio unit 520 or a video unit 520 or any other unit suited for enabling analog signal transmission and/or receiving. The D+ pin 512, the D− pin 513 and the ID pin 514 of said USB interface may be used for transmitting/receiving analogue signals, for instance audio signals or video signals. E.g. in case of an audio transmission, said signal unit 520 represents an audio unit 520, and in case of stereo audio transmission the audio unit 520 may transmit the right channel to a right speaker of a headset via the D+ pin 512 and may transmit the left channel to a left speaker of a headset via the D− pin 513, or vice versa, and the audio unit may receive a microphone signal of said headset via the ID pin 514. The association of the D+ pin 512, the D− pin 513 and the ID pin 514 to right/left speaker channel and microphone line is not limited and not restricted to the given example depicted in FIGS. 5 and 6. In case of a mono transmission, e.g. if a mono headset is connected to the terminal 500, then the audio unit 520 may be connect to one or both of D+ pin 512 and D− pin 513. Thus, at least one of the at least one data line 512, 513 can be used for transmitting an analog signal.

Furthermore, the second electronic device 580 may represent a headset configured to communicate to said first electronic device 500, or an adaptor 580 configured to connect a headset to the serial interface 510 of said first electronic device 500, wherein the second device 580 comprises a cable 585 and a serial interface 590. For instance, this serial interface 590 may represent a USB interface, wherein the assignment of the D+ pin 592, the D− pin 593, and the ID pin 594 of the USB interface of said second electronic device 580 may correspond to the assignment of the corresponding pins of the USB interface of the first electronic device 500. The second electronic device may comprise a Micro or Mini USB cable 585 terminated with an USB interface 590 in order to connect to the terminal 500. For instance, said USB interface 590 may represent a Mini or Micro USB Type B plug/receptacle.

Thus, according to the present invention, a headset 580 or a headset USB adapter 580 comprising a cable 585 and a USB interface 590 may be connected to a terminal 500 via a single USB connection, so that only one connector is necessary, and a second connector, such as a 2.5 mm jack, is not needed. Hence, the invention may solve the size, cost and industrial design problem of devices that employ analogue audio headset and USB features, for instance USB OTG features or other non-OTG USB features. The invention eliminates the need for a headset jack (HJ), e.g. a 2.5 mm or 3.5 mm connection, thus reducing cost and improving the industrial design by eliminating the surface blemish of a HJ.

Further, for instance, it may be designed that when a headset 580, or a headset USB micro/mini adapter 580, is connected by its cable 585 and its USB connector 590 to the terminal 500 it physically blocks the connection of any other USB cable (not shown in FIGS. 5*a* and 5*b*), and when a USB cable of another USB device is connected, it blocks the connection of the headset 580 or the headset USB micro/mini adapter 580.

Thus, according the present invention, providing a stereo sound to a headset while simultaneously receiving a microphone signal is possible by means of a single USB micro/mini connection.

The explanations and advantages concerning this third and fourth exemplary embodiment of an electronic device according to the present invention also hold for the succeeding exemplary embodiments depicted in FIGS. 6*a* and 6*b*, respectively.

FIG. 6*a* depicts a block diagram of a fifth exemplary embodiment of an electronic device 680, in the sequel denoted as second electronic device 680, according to the present invention, wherein said second electronic device 680 may basically correspond to the second electronic device 580 depicted in FIG. 5*a* and may for instance represent a headset 680 or a headset adapter 680 comprising a serial interface 590, for instance a headset 680 or a headset USB adapter 680. This headset 680 or headset USB adapter 680 may further comprise a hook unit 682, which may be connected to a hook button (not shown) via signal line 683. The function of this hook button will be explained in the sequel. Furthermore, also a headset or a headset USB adapter as exemplarily depicted in FIG. 5*a* without a hook function may be connected to the electronic device 600 depicted in FIG. 6*b*.

FIG. 6*b* depicts a block diagram of a sixth exemplary embodiment of an electronic device 600, in the sequel denoted as first electronic device 600, according to the present invention, wherein said first electronic device 600 may basically correspond to the first electronic device 500 depicted in FIG. 5*b* and may represent any kind of terminal, e.g. a mobile phone or a handheld or a PC or anything else. Said terminal 600 may comprise a USB interface 610, a USB transceiver 640 being adapted to be connected to the D+ pin 612, the D− pin 613 and the VBus pin 611 of said USB interface 610. The terminal further comprises a controller 625, which is configured to control said USB OTG transceiver 640, an audio codec 630 and a detection block 620. Said audio codec may basically correspond to the audio unit 520 depicted in FIG. 5*b* in is configured to communicate via a headset 680 or a headset USB micro/mini adaptor 680 via the ID pin 614 and the D+ pin 612 and the D− pin 613.

The USB transceiver 640 may support USB device detection and data transmission, and the audio codec 630 and the audio unit 520 may process analog and digital audio signals and route audio in and out. The detection block may detect the voltage level in ID pin 614 and communicates this voltage level to the controller. The optional USB filter may compensates the D+/D− waveforms and protects the audio pins, and the optional EMC filter 650 may protect the microphone line for RF immunity.

Details of the function of this terminal 600 will now be explained with respect to the flowchart of a third exemplary embodiment of a method according to the present invention depicted in FIG. 7*a*, and with respect to the flowchart of a fourth exemplary embodiment of a method according to the present invention shown in FIG. 7*b*, and with respect to an exemplary state diagram for an exemplary embodiment of an electronic device according to the present invention depicted in FIG. 8.

In case that no USB cable is connected to the USB interface 610 and after switching on the power of the terminal 600, the terminal 600 may be in an USB idle mode 810 waiting for the connection of device the USB interface 610 (step 710).

If a USB cable is connected to the USB interface 610, the connected USB device may be detected by the USB transceiver 640 (step 710) and the controller 640 is informed. Then, it may be determined whether said connected USB device is a compatible device or not (step 720), wherein a compatible device according to the present invention may represent a device being configured to communicate to the terminal 600 via the ID pin 614 of the USB interface 610, like a headset 680 or headset USB adaptor 680 depicted in FIG. 6*a*. Said detection may be performed by the detection block 620, wherein a connected device may be determined to be compatible if the detected voltage at the ID pin 614 is between a first voltage threshold VT1 and a second voltage threshold VT2, wherein VT1<VT2 may hold, or for instance by detecting whether the voltage at the ID pin 614 is below the highest value out of VT1 and VT2. Thus, a compatible device may indicate itself by setting the voltage of the USB ID pin to a value into a range between VT1 and VT2, or to a value being below VT2.

For instance, the voltage of the microphone line of a headset 680 or a headset USB adaptor 680 is fixed in a narrow range during operation due to the voltage drop across the microphone when it is biased by a power supply, so that this microphone voltage on the microphone line can be detected by the detection block 620 in case the microphone line of the headset 680 or headset USB adapter 680 is wired to the ID pin 694 of the USB plug 690 and connected to the ID pin 614 of the terminal 600, wherein VT1 and VT2 is chosen that the microphone voltage is between VT1 and VT2. Thus, the headset 680 or the headset USB adapter 680 automatically communicates an information signal via the ID pin 694 well-suited for identification at the terminal 600.

If the detection block 620 detects that a compatible USB device is connected to the USB interface 610, e.g. a headset 680 or headset USB adapter 680 as depicted in FIG. 6*a*, then the terminal 600 may be switched into a second state (step 730), wherein in this second state the controller 625 enables the audio codec 630 and enables the audio lines to D+ and D− pins 612, 613 of the USB interface 610. Before enabling the audio codec 630, the USB transceiver may be switched into three-state logic state or may be switched off by the controller in order to prevent any loading interference between the USB D+/D− lines and the audio lines. This second state of said terminal 600 corresponds to the audio mode 820 depicted in FIG. 8, and in this second state the terminal 600 communicates with the headset 680 or headset USB adapter 680 via the ID pin 614 by means of receiving a microphone signal.

If the detection block 620 detects that a non-compatible USB device is connected to the USB interface 610, i.e. a common USB device not being suited to communicate via the ID pin, then said terminal 600 is switched into a first state (step 740), wherein in this first state the controller enables USB data transmission of said USB transceiver 640. This detection may be performed by detecting a voltage at the ID pin 614 being higher than VT2. Before enabling USB data transmission, the audio codec is switched off or switched in to three-state logic state in order to prevent any loading interference. This first state of said terminal 600 corresponds to the USB mode 840 depicted in FIG. 8.

For instance, the switching into the first and the second state may be performed by a mechanical switch, a hardware controlled switch, or a software controlled switch.

If the connected USB micro/mini device is disconnected (step 750), then the terminal switches into the idle mode 815 and returns to step 710.

Furthermore, the headset 680 or the headset USB adapter 680 may be configured to be switched into one out of two states, wherein a first state corresponds to a normal audio mode suited to connect the speakers and the microphone to the terminal as mentioned above in the first state of said terminal, and wherein a second state corresponds to a hook mode suited for performing control operation, e.g. stopping playing music in a music player or changing the radio channel or answer or and a call in a mobile phone. The headset 680 or the headset USB OTG adapter 680 may comprise a hook unit 682 for signaling the second state, e.g. in response that a user presses a hook button or in response to another hardware or software control via the line 683. For instance, said hook unit 682 switches the voltage on the microphone line to a voltage value being below VT1 in case that the headset USB adapter 680 or the headset 680 is switched into the second state, e.g. by connecting the microphone line to GND.

This way, the hook mode can be detected by the detection unit 620 in case that the voltage at the ID pin 615 falls below VT1, and in this case the terminal 600 goes into a third state which corresponds to an audio hook mode 830 depicted in FIG. 8, wherein the controller 625 may perform related operations.

Figure 7A:
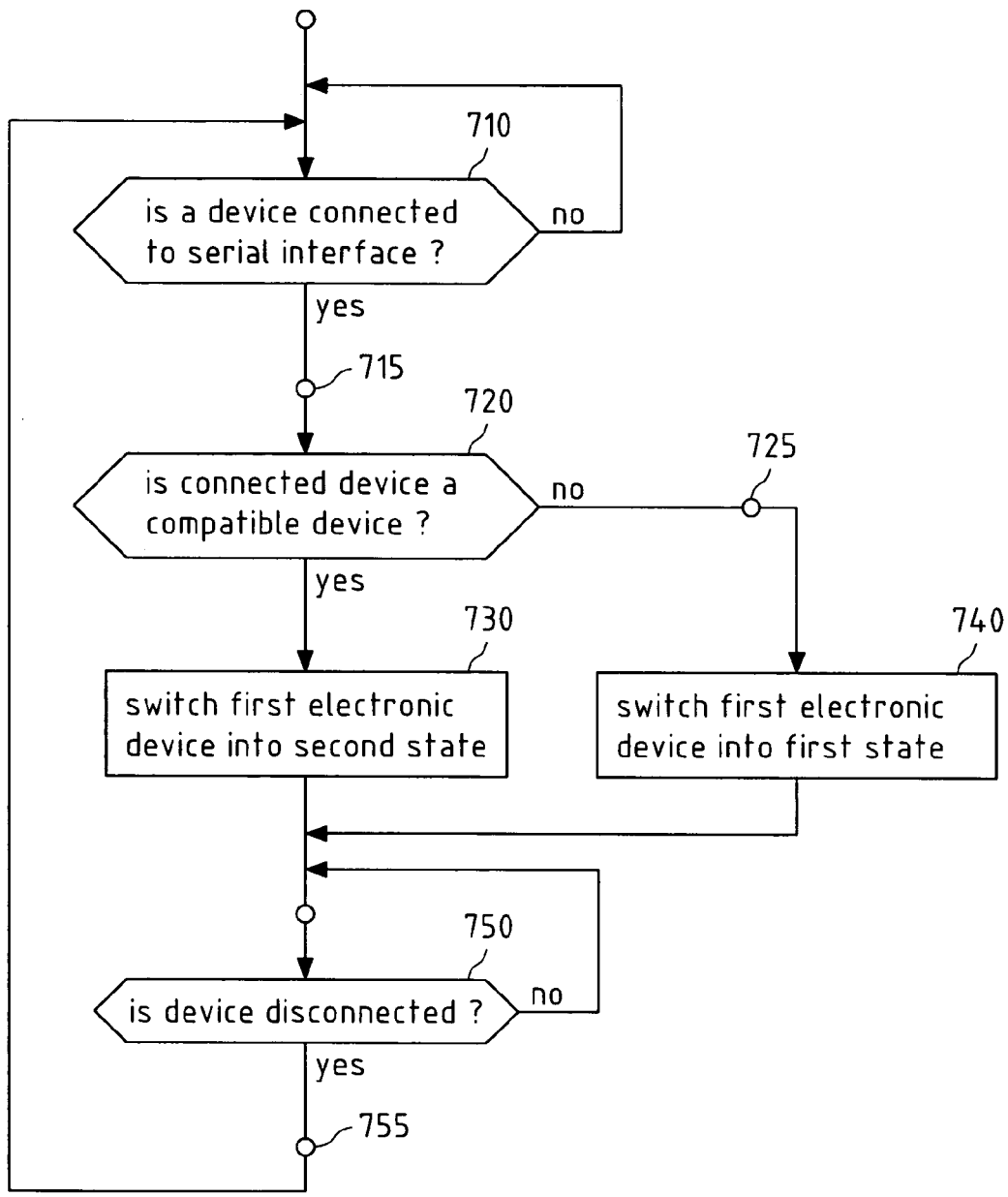
FIG. 7a: a flowchart of a third exemplary embodiment of a method according to the present invention.
Figure 7B:
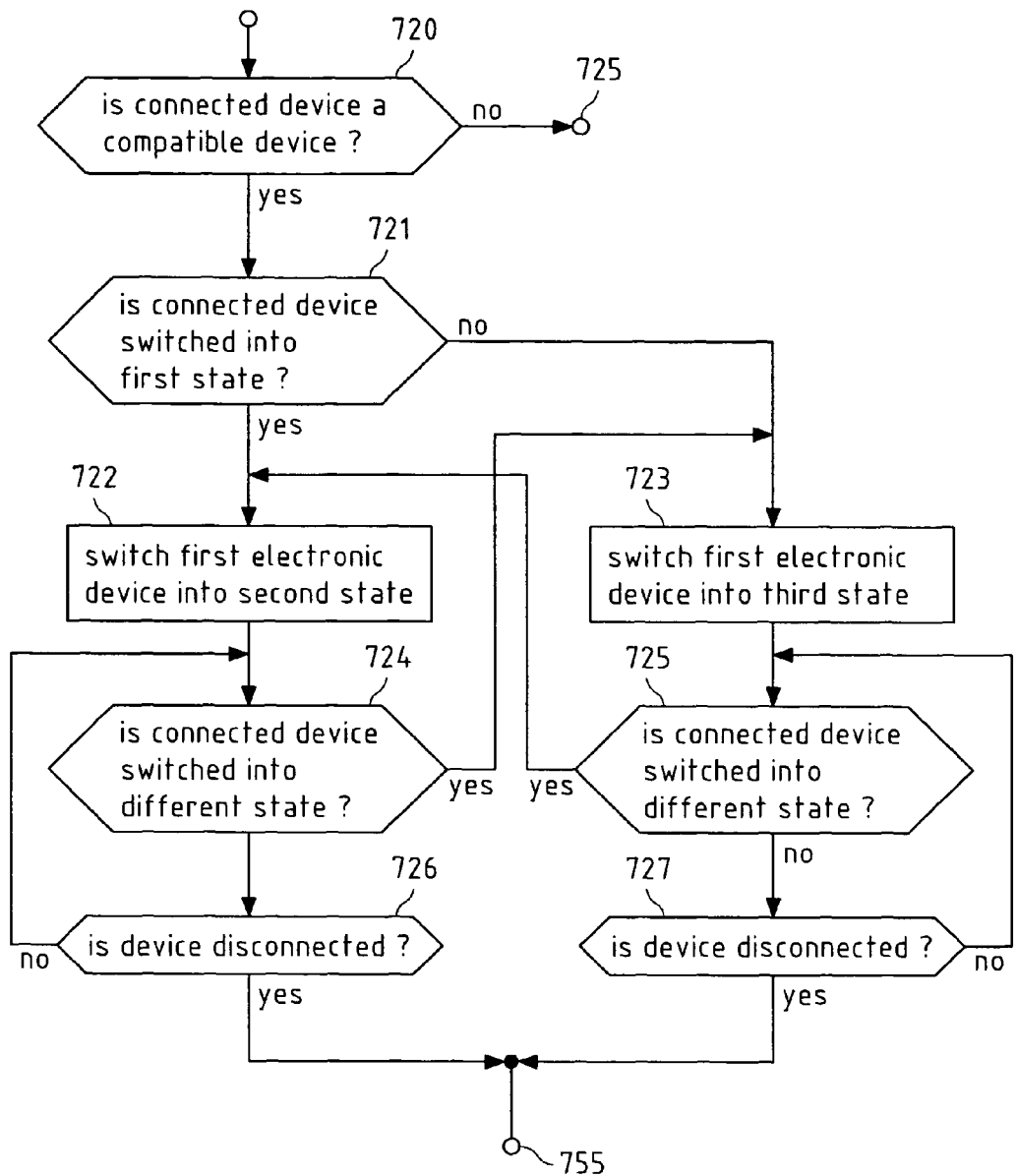
FIG. 7b: a flowchart of a fourth exemplary embodiment of a method according to the present invention.

As depicted exemplarily in FIG. 7b, wherein the flowchart of FIG. 7b may be inserted into the flowchart depicted in FIG. 7a at the points of intersection 715 and 755, respectively, at step 720 the detection unit 620 may first determine whether the connected device is a compatible device based on the voltage level at the ID pin 614, wherein in case the detected voltage level at the ID pin 614 is higher than VT2 the method switches to step 740 (not shown in FIG. 7b) depicted in FIG. 7a and the terminal is switched in to the first state, and otherwise it is checked whether the compatible device is in the first state (step 721), i.e. if the voltage level at the ID pin 614 is between VT1 and VT2. If this is the case, then the terminal 600 is switched into the second state (step 722) as mentioned above, and thus the audio mode 820 according to FIG. 8 is enabled. If the detected voltage level is below VT1, then the compatible device is not in the first state, e.g. it is switched into the hook mode, and the terminal 600 is switched into said third state (step 723).

At steps 724 and 725, it is checked whether the headset 680 or the headset USB adapter 680 is switched from the second into the first state or vice versa, and if this is the case, the method jumps to steps 723 and 722, respectively, in order to change the state of the terminal. If it is detected that the headset 680 or the headset USB adapter 680 is disconnected (steps 726, 727), then the method jumps to step 710 depicted in FIG. 7a corresponding to the USB idle mode 810 depicted in FIG. 8.

Figure 8:
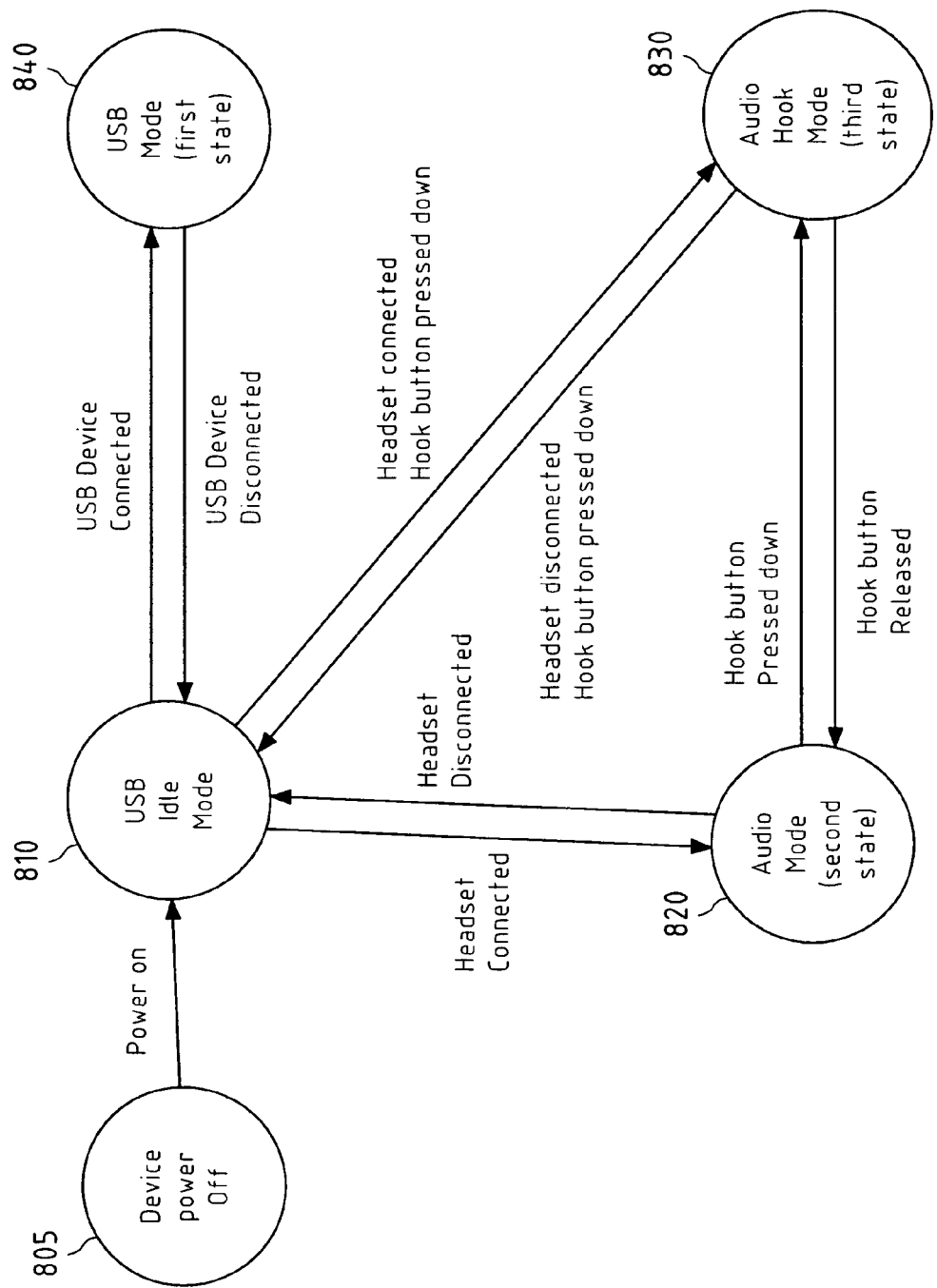
FIG. 8. an exemplary state diagram for an exemplary embodiment of an electronic device according to the present invention.

The state machine depicted in FIG. 8 may be implemented in the controller 620.

The steps 720 and 721 depicted in FIG. 7b may be performed in a single stage, wherein the detection unit 620 detects the voltage VD of the ID pin 614 and switches to step 723 in case that the VD<VT1, and switches to step 722 in case that VT1<=VD<VT2, and switches to step 740 (depicted in FIG. 7a) in case the VD>=VT2.

Thus, the present invention allows a connection of an audio/video device to a terminal via a serial interface, e.g. a USB interface, for analog signal transmission, wherein after disconnecting the audio/video device the serial interface can be used according to the serial interface standard.

The invention has been described above by means of exemplary embodiments. It should be noted that there are alternative ways and variations which are obvious to a skilled person in the art and can be implemented without deviating from the scope and spirit of the appended claims.

Even as this document takes the USB interface as an example for describing a variety of embodiments of the invention it should be noted that the invention can be implemented with any serial interface which uses data and ID lines in a similar way as provided in the USB (USB OTG, Mini and Micro USB, with and without On-The-Go capability) standard.

What is claimed is:

1. A method, comprising:
    enabling a communication between a first electronic device and a compatible second electronic device via an identification pin of a serial interface of said first electronic device, said identification pin allowing said first electronic device and said second electronic device to communicate with each other so as to enable said first electronic device and said second electronic device to switch and/or negotiate their respective host/device roles, said enabling a communication being a bidirectional communication other than said communication associated with said identification pin of said serial interface allowing said first electronic device and said second electronic device to switch and/or negotiate their respective host/device roles.

2. The method according to claim 1, wherein said serial interface is a Universal Serial Bus interface.

3. The method according to claim 1, said method further comprises at least one out of:
    transmitting at least one information parameter for identifying the first electronic device via said communication; and
    receiving at least one information parameter for identifying the second electronic device via said communication.

4. The method according to claim 1, wherein said communication via the identification pin of said serial interface is based on an Enhancement Control Interface link.

5. The method according to claim 3, said method further comprising:
    negotiating, based on said at least one information parameter, a configuration for a wireless interface of said first electronic device, said configuration enabling a wireless connection between said first and said second electronic device.

6. The method according to claim 1, the method further comprising:
    receiving power from said second electronic device via said serial interface.

7. The method according to claim 6, wherein said first electronic device comprises a rechargeable power supply, the method further comprising:
    charging said rechargeable power supply with said received power.

8. The method according to claim 1, wherein said communication via the identification pin of the serial interface comprises at least one out of:
    transmitting an analog signal via the identification pin, and
    receiving an analog signal via the identification pin.

9. The method according to claim 1, wherein said method further comprises:

detecting whether a device connected to the serial interface of said first electronic device represents a compatible device, wherein a compatible device represents a device being configured to communicate via the identification pin of a serial interface.

10. The method according to claim 9, wherein said serial interface comprises at least one data line, wherein in a first state said first electronic device is configured to enable serial interface functionality via at least one out of said at least one data line of said serial interface, and wherein in a second state said first electronic device is configured to enable communication via the identification pin of the serial interface; and wherein the method comprises:
- switching said first electronic device into the first state in case the connected device is identified as a non-compatible device; and
- switching said first electronic device into the second state in case the connected electronic device is identified as a compatible device.

11. The method according to claim 10, wherein said serial interface is a Universal Serial Bus interface, and wherein in said first state said first device is configured to enable Universal Serial Bus functionality via at least one out of the D+ pin and D− pin.

12. The method according to claim 11, wherein said first electronic device comprises an audio unit, said audio unit being configured to communicate to a compatible Universal Serial Bus audio device, and wherein in said second state said first electronic device enables said audio unit to communicate at least one audio signal between the first electronic device and the compatible Universal Serial Bus audio device via at least the identification pin of said Universal Serial Bus interface.

13. The method according to claim 11, wherein said compatible Universal Serial Bus device is configured to be switched into one out of at least two states, and wherein said method further comprises:
- detecting a state out of said at least two states of said second electronic device, and
- switching the first electronic device into a state corresponding to the detected state of the compatible Universal Serial Bus device.

14. The method according to claim 9, wherein said detecting is based on detecting a voltage level at the identification pin of the serial interface.

15. The method according to claim 12, wherein said compatible Universal Serial Bus audio device is configured to be switched into one out of at least two states, wherein a first state of said at least two states represents a normal audio mode, and wherein a second state of said at least two states represents a hook mode suited for performing control operations; and
wherein said method further comprises:
- detecting a state out of said at least two states of said second electronic device;
- switching the first electronic device into the second state in case the first state is detected; and
- switching the first electronic device into a third state in case the second state is detected, wherein in said third state said first electronic device is configured to receive control signals from the audio device.

16. The method according to claim 12, wherein said compatible Universal Serial Bus audio device represents one out of a headset and a headset-Universal Serial Bus adapter, wherein in said second state of the first electronic device the audio unit connects a microphone input line of said audio unit to the identification pin of said Universal Serial Bus interface and connects at least one speaker line of said audio unit to at least one of the D+ and D− pin of said Universal Serial Bus interface.

17. The method according to claim 11, wherein said first electronic device comprises a Universal Serial Bus transceiver which is configured to enable said Universal Serial Bus functionality according to the first state, said method further comprising one out of:
- turning off said Universal Serial Bus transceiver in case that the first electronic device is not in the first state; and
- switching said Universal Serial Bus transceiver into three-state logic state in case that the first electronic device is not in the first state.

18. An electronic device, comprising:
- a serial interface comprising one or more data lines and an identification pin; and
- a signal unit configured to enable a communication between said electronic device and a compatible second electronic device via the identification pin of said serial interface, said identification pin configured to allow said electronic device and said second electronic device to communicate with each other so as to enable said electronic device and said second electronic device to switch and/or negotiate their respective host/device roles, said signal unit configured to enable a bidirectional communication other than said communication associated with said identification pin of said serial interface allowing said electronic device and said second electronic device to switch and/or negotiate their respective host/device roles.

19. The device according to claim 18, wherein said serial interface is a Universal Serial Bus interface.

20. The device according to claim 18, wherein said signal unit is configured to perform at least one out of:
- transmitting at least one information parameter for identifying the first electronic device via said communication; and
- receiving at least one information parameter for identifying the second electronic device via said communication.

21. The device according to claim 18, wherein said signal unit comprises an Enhancement Control Interface.

22. The device according to claim 20, further comprising a wireless interface and a controller, wherein said controller is further configured to perform:
- negotiating, based on said at least one information parameter, a configuration for a wireless interface of said first electronic device, said configuration enabling a wireless connection between said first and said second electronic device.

23. The device according to claim 20, wherein said device receives power from said second electronic device via said serial bus interface.

24. The device according to claim 23, further comprising a rechargeable power supply, wherein said rechargeable power supply is charged with said received power.

25. The device according to claim 18, wherein said communication via the identification pin of the serial interface comprises at least one out of:
- transmitting an analog signal via the identification pin, and
- receiving an analog signal via the identification pin.

26. The device according to claim 18, further comprising a controller, wherein said controller is further configured to perform:
- detecting whether a device connected to the serial interface of said electronic device represents a compatible serial interface device, wherein a compatible serial interface device represents a device being configured to communicate via the identification pin of a serial interface.

27. The device according to claim 26, further comprising a serial interface transceiver, wherein in a first state said electronic device is configured to enable serial interface functionality via at least one out of the at least one data line of said serial interface by means of said serial interface transceiver, and wherein in a second state said electronic device is configured to enable communication via the identification pin of the serial interface by means of said signal unit; and wherein said controller is configured to perform:
  switching said first electronic device into the first state in case the connected device is identified as a non-compatible serial interface device; and
  switching said first electronic device into the second state in case the connected electronic device is identified as a compatible serial interface device.

28. The device according to claim 27, wherein said serial interface is a Universal Serial Bus interface, and wherein said serial interface represents a Universal Serial Bus transceiver, and wherein in said first state said first device is configured to enable Universal Serial Bus functionality via at least one out of the D+ pin and D− pin of the Universal Serial Bus interface.

29. The device according to claim 28, comprising an audio unit, said audio unit comprising said signal unit and being configured to communicate to a compatible audio device, and wherein in said second state said audio unit is configured to communicate at least one audio signal between the electronic device and compatible Universal Serial Bus audio device via at least the identification pin of said Universal Serial Bus interface.

30. The device according to claim 28, wherein said compatible Universal Serial Bus device is configured to be switched into one out of at least two states, and wherein said controller is further configured to perform:
  detecting a state out of said at least two states of said second electronic device, and
  switching the first electronic device into a state corresponding to the detected state of the compatible Universal Serial Bus device.

31. The device according to claim 26, wherein said controller performs detection based on a voltage level at the identification pin of the serial interface.

32. The device according to claim 29, wherein said compatible Universal Serial Bus audio device is configured to be switched into one out of at least two states, wherein a first state of said at least two states represents a normal audio mode, and wherein a second state of said at least two states represents a hook mode suited for performing control operations; and wherein said detection unit is further configured to perform:
  detecting a state out of said at least two states of said second electronic device;
  switching the first electronic device into the second state in case the first state is detected; and
  switching the first electronic device into a third state in case the second state is detected, wherein in said third state said first electronic device is configured to receive control signals from the audio device.

33. The device according to claim 29, wherein said audio unit represents one out of a headset and a headset-Universal Serial Bus adapter, and wherein the controller is configured to enable the audio unit and connects a microphone input line of said audio unit to the identification pin of said Universal Serial Bus interface and connects at least one speaker line of said audio unit to at least one of the D+ and D− pin of said Universal Serial Bus interface when the electronic device is switched into the second state.

34. An electronic device, comprising:
  means for providing a serial interface comprising one or more data lines and an identification pin; and
  means for enabling communication between said electronic device and a compatible second electronic device via the identification pin of said means for providing a serial interface, said identification pin allowing said electronic device and said second electronic device to communicate with each other so as to enable said electronic device and said second electronic device to switch and/or negotiate their respective host/device roles, said means for enabling communication being a bidirectional communication other than said communication associated with said identification pin of said serial interface allowing said electronic device and said second electronic device to switch and/or negotiate their respective host/device roles.

35. A computer program product in which a program code is stored in a computer readable medium, said program code when executed on a processor realizing the method according to claim 1.

36. The method according to claim 1, wherein the second electronic device is one out of a speaker and a microphone and wherein said communication is via a wire configured to be connected to said second electronic device and configured to be connected to the identification pin of said serial interface.

* * * * *